(12) United States Patent
Wolfgang (10) Patent No.: US 8,223,643 B1
(45) Date of Patent: Jul. 17, 2012

(54) METHOD FOR PACKET-LEVEL FEC ENCODING A STREAM OF SOURCE PACKETS USING SHIFTED INTERLEAVING

(75) Inventor: H. Lewis Wolfgang, Stamford, CT (US)

(73) Assignee: Kencast, Inc., Norwalk, CT (US)

( * ) Notice: Subject to any disclaimer, the term of this patent is extended or adjusted under 35 U.S.C. 154(b) by 1240 days.

(21) Appl. No.: 11/516,197

(22) Filed: Sep. 6, 2006

Related U.S. Application Data (60) Provisional application No. 60/714,565, filed on Sep. 6, 2005.

(51) Int. Cl.
*G01R 31/08* (2006.01)

(52) U.S. Cl. .......... 370/235; 370/252; 714/758

(58) Field of Classification Search ............... 375/219, 375/227, 259; 714/752, 712, 776, 746, 751; 370/235
See application file for complete search history.

(56) References Cited

U.S. PATENT DOCUMENTS

| | | | |
|---|---|---|---|
| 4,009,347 A | 2/1977 | Flemming et al. | |
| 4,525,833 A | 6/1985 | Cau et al. | 370/470 |
| 4,718,066 A | 1/1988 | Rogard | 371/35 |
| 4,907,277 A | 3/1990 | Callens et al. | 704/202 |
| 5,485,474 A | 1/1996 | Rabin | 371/37 |
| 5,594,490 A | 1/1997 | Dawson et al. | 725/67 |
| 5,600,663 A | 2/1997 | Ayanoglu et al. | 371/41 |
| 5,617,541 A | 4/1997 | Albanese et al. | 709/207 |
| 5,631,907 A | 5/1997 | Guarneri et al. | 370/474 |
| 5,768,533 A | 6/1998 | Ran | 709/247 |
| 5,790,524 A | 8/1998 | Bennett et al. | 370/244 |
| 5,815,514 A | 9/1998 | Gray | |
| 5,903,574 A | 5/1999 | Lyons | |
| 5,959,974 A | 9/1999 | Badt et al. | 370/233 |
| 6,012,159 A | 1/2000 | Fischer et al. | 714/755 |
| 6,031,818 A | 2/2000 | Lo et al. | 714/748 |
| 6,052,819 A | 4/2000 | Barker et al. | 714/776 |
| 6,104,757 A | 8/2000 | Rhee | 375/240 |
| 6,141,788 A | 10/2000 | Rosenberg et al. | 714/774 |
| 6,151,696 A | 11/2000 | Miller | 714/748 |
| 6,189,039 B1 | 2/2001 | Harvey et al. | 709/232 |
| 6,249,810 B1 | 6/2001 | Kiraly | 709/217 |
| 6,272,658 B1 | 8/2001 | Steele et al. | 714/752 |
| 6,289,054 B1 | 9/2001 | Rhee | 375/240.27 |
| 6,307,487 B1 | 10/2001 | Luby | 341/50 |
| 6,317,462 B1 | 11/2001 | Boyce | 375/240.27 |
| 6,320,520 B1 | 11/2001 | Luby | 341/50 |

(Continued)

OTHER PUBLICATIONS

Michael O.Rabin, "Probabilistic Algorithms in Finite Fields", Siam J. Comput. vol. 9, No. 2, May 1980, pp. 273-280.

(Continued)

*Primary Examiner* — Anh-Vu Ly
*Assistant Examiner* — Gbemileke Onamuti
(74) *Attorney, Agent, or Firm* — Fitzpatrick, Cella, Harper & Scinto

(57) ABSTRACT

A method for transmitting interleaved shares of packet-level FEC encoded packets, in which a given time shift occurs between consecutive shares, includes determining a current state; associating a packet with a share based on the current state; and determining a position of the packet within the share. Each share includes source packets and error-correcting or wildcard packets. If the position of the packet corresponds to a source packet position, a contribution of the packet to the wildcard packets of the share is computed, and the packet is transmitted as a source packet. If the position of the packet corresponds to a wildcard packet position, the packet is transmitted as a wildcard packet.

22 Claims, 2 Drawing Sheets

U.S. PATENT DOCUMENTS

| | | | | |
|---|---|---|---|---|
| 6,336,200 | B1 | 1/2002 | Wolfgang | 714/752 |
| 6,370,666 | B1 * | 4/2002 | Lou et al. | 714/751 |
| 6,373,406 | B2 | 4/2002 | Luby | 341/50 |
| 6,411,223 | B1 | 6/2002 | Haken et al. | 341/50 |
| 6,434,191 | B1 * | 8/2002 | Agrawal et al. | 375/227 |
| 6,445,717 | B1 | 9/2002 | Gibson et al. | |
| 6,463,080 | B1 | 10/2002 | Wildey | |
| 6,486,803 | B1 | 11/2002 | Luby et al. | 341/50 |
| 6,496,477 | B1 | 12/2002 | Perkins et al. | 370/228 |
| 6,498,821 | B2 | 12/2002 | Jonas et al. | 375/347 |
| 6,526,022 | B1 | 2/2003 | Chiu et al. | |
| 6,567,929 | B1 | 5/2003 | Bhagavath et al. | |
| 6,567,948 | B2 | 5/2003 | Steele et al. | 714/746 |
| 6,570,843 | B1 | 5/2003 | Wolfgang | 370/216 |
| 6,574,213 | B1 | 6/2003 | Anandakumar et al. | 370/349 |
| 6,574,795 | B1 | 6/2003 | Carr | |
| 6,594,798 | B1 | 7/2003 | Chou et al. | |
| 6,606,723 | B2 | 8/2003 | Wolfgang | 714/752 |
| 6,609,223 | B1 * | 8/2003 | Wolfgang | 714/752 |
| 6,614,366 | B2 | 9/2003 | Luby | 341/50 |
| 6,671,807 | B1 | 12/2003 | Jaisimha et al. | |
| 6,693,907 | B1 | 2/2004 | Wesley et al. | |
| 6,701,373 | B1 | 3/2004 | Sakazawa et al. | |
| 6,735,634 | B1 | 5/2004 | Geagan, III et al. | |
| 6,765,889 | B1 | 7/2004 | Ludwig | |
| 6,782,490 | B2 | 8/2004 | Maxemchuk et al. | |
| 6,804,244 | B1 | 10/2004 | Anandakumar et al. | |
| 6,868,083 | B2 | 3/2005 | Apostolopoulas et al. | 370/392 |
| 6,937,582 | B1 | 8/2005 | Kronestedt | |
| 7,024,609 | B2 | 4/2006 | Wolfgang et al. | 714/748 |
| 7,068,601 | B2 | 6/2006 | Abdelilah et al. | |
| 7,139,243 | B2 | 11/2006 | Okumura | 370/248 |
| 7,315,967 | B2 | 1/2008 | Azenko et al. | |
| 7,324,578 | B2 | 1/2008 | Kwon et al. | 375/135 |
| 7,418,651 | B2 | 8/2008 | Luby et al. | |
| 7,425,905 | B1 | 9/2008 | Oberg | 341/58 |
| 7,516,387 | B2 | 4/2009 | Arnold et al. | 714/751 |
| 7,796,517 | B2 | 9/2010 | Chen et al. | |
| 2001/0033611 | A1 * | 10/2001 | Grimwood et al. | 375/219 |
| 2001/0046271 | A1 | 11/2001 | Jonas et al. | 375/347 |
| 2002/0035730 | A1 | 3/2002 | Ollikainen et al. | 725/93 |
| 2002/0049939 | A1 * | 4/2002 | Steele et al. | 714/712 |
| 2002/0075964 | A1 * | 6/2002 | Okumura | 375/259 |
| 2002/0097678 | A1 | 7/2002 | Bisher, Jr. et al. | |
| 2003/0009718 | A1 | 1/2003 | Wolfgang et al. | |
| 2004/0025186 | A1 | 2/2004 | Jennings et al. | |
| 2004/0170201 | A1 | 9/2004 | Kubo et al. | |
| 2006/0059409 | A1 | 3/2006 | Lee | 714/784 |
| 2006/0064626 | A1 | 3/2006 | Fischer et al. | 714/776 |
| 2006/0253763 | A1 * | 11/2006 | Oliva et al. | 714/746 |
| 2007/0022361 | A1 * | 1/2007 | Bauer et al. | 714/776 |
| 2008/0098284 | A1 | 4/2008 | Wolfgang et al. | |
| 2008/0117819 | A1 | 5/2008 | Flott et al. | 370/232 |
| 2008/0244001 | A1 | 10/2008 | Fang | 709/203 |
| 2008/0298271 | A1 | 12/2008 | Morinaga et al. | 370/252 |
| 2009/0177948 | A1 | 7/2009 | Fischer et al. | 714/776 |
| 2009/0210773 | A1 | 8/2009 | Fang | 714/776 |
| 2010/0005178 | A1 | 1/2010 | Sindelaru et al. | 709/228 |
| 2010/0218074 | A1 | 8/2010 | Fang et al. | 714/776 |

OTHER PUBLICATIONS

Michael O. Rabin, Efficient Dispersal of Information for Security, Load Balancing, and Fault Tolerance, Journal of the Association for Computing Machinery, vol. 36, No. 2, Apr. 1989, pp. 335-348.

R.J. McEliece and D.V. Sarwate, "On Sharing Secrets and Reed-Solomon Codes", Communications of the ACM, Sep. 1981 vol. 24, No. 9, pp. 583-584.

Adi Shamir, "How to Share a Secret", communications of the ACM, Nov. 1979; vol. 22, No. 11, pp. 612-613.

C.A. Asmuth and G.R. Blakley, Proceedings of the 1982 Symposium on Security and Privacy, IEEE Computer Society, Apr. 26-28, 1982 Oakland California, pp. 156-169.

Ehud D. Karnin, et al. "On Secret Sharing Systems", IEEE Transactions on Information Theory, vol. It-29, No. 1, Jan. 1983.

McAuley, "Reliable Broadband Communication Using a Burst Erasure Correcting Code", SIGCOMM '90 Symposium, pp. 297-306, Sep. 1990.

Miller, "Reliable Multicast Protocols: A Practical View", Local Computer Networks Conference Proceedings, Nov. 1997, pp. 369-378.

MacKay, David, J.C., "Information Theory, Inference and Learning Algorithms," Cambridge University Press, 2003.

* cited by examiner

| 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|----|----|----|----|----|----|----|----|
| S1 | S3 | S5 | EC | S11 | S13 | S15 | S17 | EC | S21 | S23 | S25 | S27 | S29 | EC | S33 |
| S2 | S4 | S6 | S7 | EC | S12 | S14 | S16 | S18 | S19 | S20 | S22 | S24 | S26 | S28 | EC | S31 | S32 | S34 |
| | | | S8 | S9 | S10 | | | | | | | | | | | S30 |

Sequence of transmitted packets (read down each column, from left-to-right):
S1, S2, S3, S4, S5, S6, EC, S7, S8, EC, S9, S10, S11, EC, S12, S13, EC, S14, S15, S16, EC, S17, …

FIG. 3

Sequence of transmitted packets (read down each column, from left-to-right):
S1, S2, S3, S4, S5, S6, S7, S8, S9, S10, S11, S12, EC, S13, S14, S15, EC. S16, S17, S18, S19, EC, …

METHOD FOR PACKET-LEVEL FEC ENCODING A STREAM OF SOURCE PACKETS USING SHIFTED INTERLEAVING

CROSS-REFERENCE TO RELATED APPLICATION

This application claims benefit of U.S. Provisional Application No. 60/714,565 filed on Sep. 6, 2005, the entire disclosure of which is incorporated by reference.

BACKGROUND OF THE INVENTION

1. Field of the Invention

The present invention relates to a method of reliably and robustly encoding data streams to be transmitted to various types of communication and computer systems, for example but not limited to, a one-way satellite broadcast system including a host computer and a subscriber computer. In particular, the present invention relates to an encoding procedure that uses a shifted interleaving of packets.

2. Description of Related Art

U.S. Pat. No. 6,609,223, U.S. Pat. No. 6,012,159, and U.S. Pat. No. 6,272,658, all of which are assigned to KenCast, Inc., are hereby incorporated by reference.

Figure 1A:
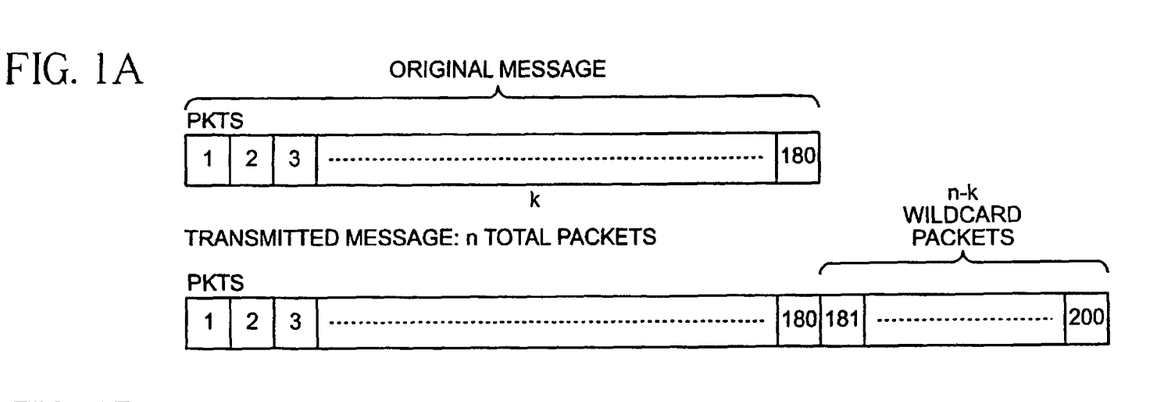
FIG. 1A depicts an example of a file of n packets, which includes k source packets and n–k wildcard packets.

U.S. Pat. No. 6,609,223 describes a method for encoding a stream of source packets, in which a number, k, of source packets of a message are packet-level forward-error-correction ("FEC") encoded to form a number n−k of error-correcting wildcard packets. The k source packets and the n−k wildcard packets (forming a total of n packets) are to be transmitted by a transmitter/encoder, such as a host computer, to a receiver/decoder, such as a subscriber computer. The message may be successfully reconstructed on the receiver/decoder side as long as any of k packets, whether they are source packets or wildcard packets or both, are successfully received. For example, a transmitted message may comprise k=180 source packets and n−k=20 wildcard packets, for a total of n=200 transmitted packets, as shown in FIG. 1A of U.S. Pat. No. 6,609,223 and reproduced herein as FIG. 1A. As long as any of 180 packets are successfully received by the receiver/decoder, the message of the 180 source packets may be reconstructed from the successfully received packets.

As disclosed in U.S. Pat. No. 6,609,223, after the arrival of each source packet at the transmitter/encoder, for each byte of the source packet, the respective error-correction contributions to the corresponding bytes of the n−k wildcard packets are computed. Thereafter, the source packet is transmitted to the receiver/decoder without waiting for the arrival of another source packet of the k source packets. This is repeated for each arriving source packet. For each wildcard packet byte, the error-correction contribution generated from each source packet is summed in an accumulator, or the like. After all the error-correction contributions have been computed using all k source packets and summed over all n−k wildcard packets, the wildcard packets are transmitted to the receiver/decoder.

As further disclosed in U.S. Pat. No. 6,609,223, the number n−k of wildcard packets is determined by the operator of the transmitter/encoder (e.g., host computer), based on knowledge of the communication channel to be used, and, specifically, on the expected number of packets to be lost during transmission, e.g., due to interference. For example, it may be expected that a maximum 4 out of 16 transmitted packets will be lost during transmission, a 25% loss rate, and thus n−k=4 wildcard packets will be computed for every k=12 source packets. (A 25% loss rate was chosen to provide an easy to understand example—actual loss rates usually are less than 5%. In any event, the present invention is not limited to any particular loss rate.) Accordingly, at the receiver/decoder, the k=12 source packets may be reconstructed without errors if any 12 of the transmitted packets, that is, any combination of transmitted source packets and wildcard packets, are successfully received.

U.S. Pat. No. 6,609,223 explains that due to the nature of actual packet streams not all expected source packets may arrive at the transmitter/encoder. Continuing with the above example, only the first nine of the expected twelve source packets may arrive at the transmitter/encoder; the last three may never arrive. Eventually, a timeout condition occurs, for example, after the elapse of a predetermined time interval from the arrival of the last source packet (this generally is referred to as the "timeout case," in contrast to the case where all expected source packets arrive). At that time, i.e., when a timeout condition occurs, the wildcard packets, and more preferably, a subset thereof, are transmitted, with an indication in the headers of the wildcard packets that, in this example, only nine source packets contributed to the information of the wildcard packets.

Figure 1B:
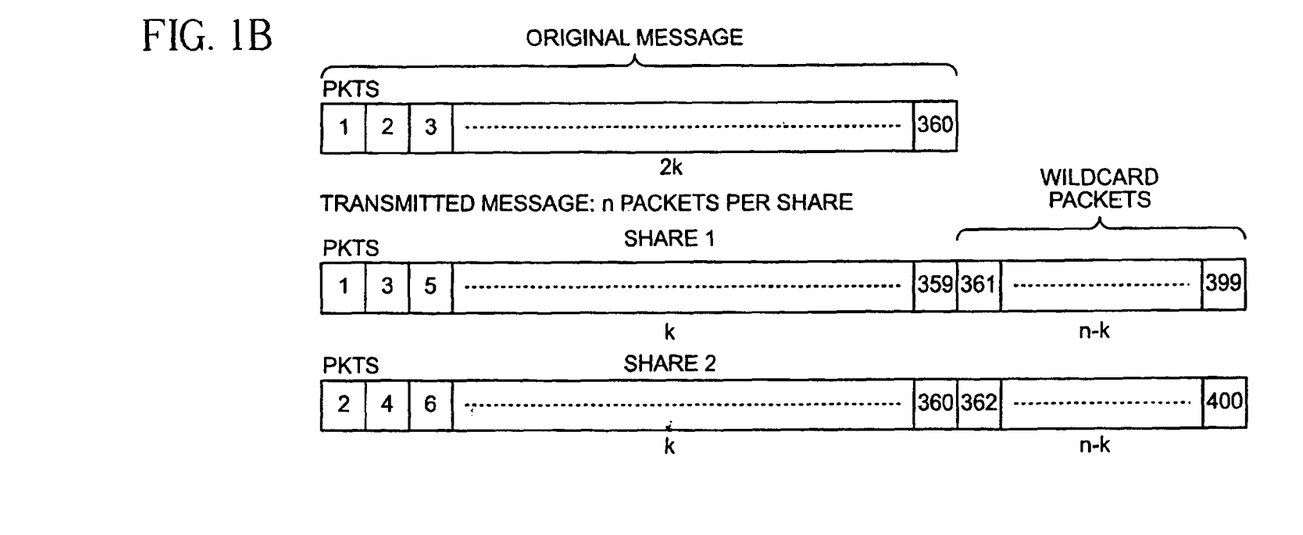
FIG. 1B depicts an example of a file with two shares, with each share including n interleaved packets comprising k interleaved source packets and n–k interleaved wildcard packets.

As also disclosed in U.S. Pat. No. 6,609,223 (and, by reference therein, U.S. Pat. No. 6,012,159 and U.S. Pat. No. 6,272,658), to further enhance the encoding scheme's robustness against interference, prior to encoding and transmission, the packets may be grouped into multiple shares in an interleaving fashion, as shown in FIG. 1B of U.S. Pat. No. 6,609,223 reproduced herein as FIG. 1B. In FIG. 1B, the odd-numbered source packets and wildcard packets comprise Share 1, while the even-number source packets and wildcard packets comprise Share 2.

Further, U.S. Pat. No. 6,609,223 discloses that a lot of multiple shares of interleaved packets may be transmitted to a subscriber computer at the same time. That is, one share of interleaved packets may be transmitted to the subscriber computer at the same time as several other shares of interleaved packets.

However, this arrangement has consequences. First, when the lot of multiple shares of interleaved packets is transmitted at the same time, all of the shares in the lot are received and ready for decoding at the subscriber computer at approximately the same time. As the number of shares per lot increases, the amount of computation required for decoding each lot increases linearly, and the time in between such computations increases linearly. Another consequence of this arrangement is that the number of error-correcting wildcard packets that must be (consecutively) transmitted at a given time increases linearly with the number of shares per lot. It would desirable to have an encoding method that overcomes these consequences.

SUMMARY OF THE INVENTION

The present invention addresses the deficiencies in the prior art by providing a method for transmitting interleaved shares of packet-level FEC encoded packets, with each share including source packets and wildcard packets, for a given time shift between consecutive shares. The method includes: determining a current state; associating a packet with a share based on the current state; and determining a position of the packet within the share. If the position of the packet corresponds to a source packet position, a contribution from the packet to wildcard packets of the share is computed and the packet is transmitted as a source packet. If the position of the packet corresponds to a wildcard packet position, the packet is transmitted as a wildcard packet.

The present invention also provides a method for shifting interleaved shares of packet-level FEC encoded packets to be transmitted, in which multiple shares of packets are transmitted as a lot. The method includes: determining a time shift, S, based on a number of source packets per share, K, a number of error-correcting packets per share, E, and a number of shares per lot, L; and shifting a share by the time shift, S, relative to a previous share, wherein the time shift, S, is given by $S=(K+E)/L$.

The present invention further provides a method for transmitting interleaved shares of packet-level FEC encoded packets to be transmitted, in which multiple shares of packets are transmitted as a lot. The method includes: determining a time shift, S, based on a number of source packets per share, K, a number of error-correcting packets per share, E, and a number of shares per lot, L, wherein $S=(K+E)/L$; shifting a share by the time shift, S, relative to a previous share; arranging the lot packets to be transmitted according into columns and rows, with C representing a column number and R representing a row number, wherein $0 \leq R \leq (L-1)$ and R corresponds to a share in the lot; transmitting a packet at a first position identified by R and C; determining a next position such that: if $R+1=L$, set $R=0$ and increase C by 1, or, if $R+1<L$, then set $R=R+1$; and transmitting a packet at the next position.

BRIEF DESCRIPTION OF THE DRAWINGS

Various aspects of the present invention can be better understood by reference to the detailed description of the invention set forth below, considered in conjunction with the attached drawings, of which.

DESCRIPTION OF THE INVENTION

According to an embodiment of the present invention, the same mechanism to encode k source packets to form a plurality of n–k error-correcting wildcard packets, as described in U.S. Pat. No. 6,609,223, is used. One of the differences between the present invention and that of U.S. Pat. No. 6,609,223 is how packets, which include source packets and wildcard packets, are grouped into shares, and how those shares are interleaved.

As discussed above, U.S. Pat. No. 6,609,223 discloses grouping packets into shares whose transmission begins and ends at approximately the same time. In the present invention packets are grouped into shares whose transmission begins and ends at different times.

According to an embodiment of the present invention, the times of these beginnings and endings are separated as much as possible. For example, for a given set of parameters: n (i.e., total number of packets per share), k (i.e., number of source packets per share), and l (i.e., number of interleaved shares (shares with interleaved packets) per lot), if the distance between packets in a given share is exactly the same as in the methods described in U.S. Pat. No. 6,609,223, then the error-correcting properties (e.g., the ability of the subscriber computer to make corrections for missing packets) of this embodiment of the present invention also are the same. However, unlike the methods described in U.S. Pat. No. 6,609,223, with the shifted interleaving of this embodiment of the present invention the subscriber computer must decode one share approximately every n packets, whereas in the interleaving method of U.S. Pat. No. 6,609,223, the subscriber computer is required to decode l shares every (l*n) packets.

Figure 2:
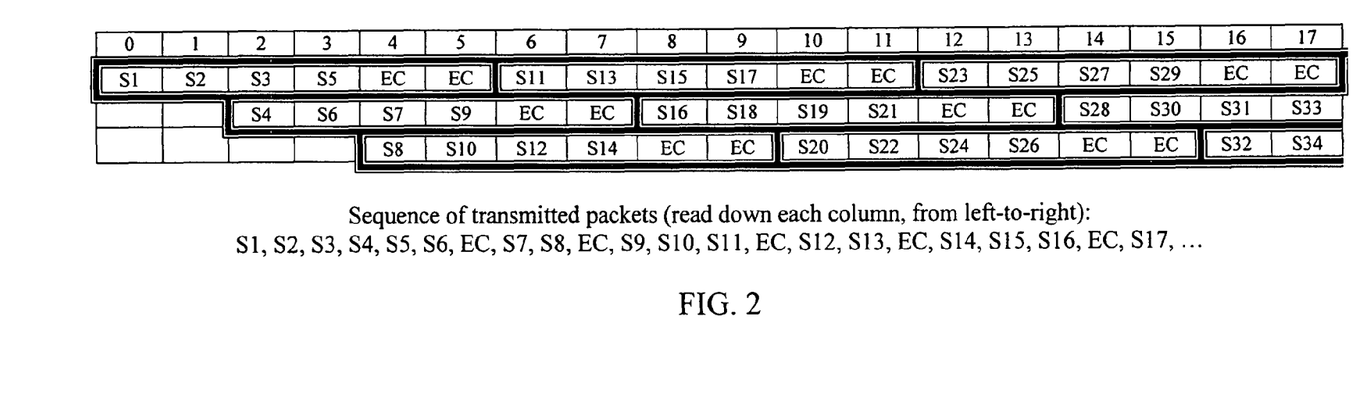
FIG. 2 depicts an example of shares of interleaved packets, according to an embodiment of the present invention, in which the shares are time-shifted with respect to each other.

As will be discussed in more detail below, FIG. 2 shows an example of a time-shifted interleaving method, according to an embodiment of the present invention. In this example, n=6, k=4, and l=3. Thus, in the current embodiment, the subscriber computer must decode one share approximately every 6 packets. In the interleaving method of U.S. Pat. No. 6,609,223, on the other hand, the subscriber computer is required to decode 3 shares every 18 packets, with the negative caveat that all 3 shares need to be completely received and ready for decoding at approximately the same time.

Because the packets for a given share must be stored in memory until they are decoded, the memory requirements for the subscriber computer still increase linearly with the number of shares per lot. However, increasing the number of shares per lot advantageously increases the robustness of the encoding scheme. That is, by increasing the distance between packets in a given share there is a decrease in the probability that a sequence of correlated errors eliminates more packets than can be recovered from a given share.

Shifted interleaving, according to embodiments of the present invention, allows for an increase in the number of shares per lot, while only requiring a constant amount of computational complexity for decoding. Therefore, shifted interleaving may be used with devices that cannot use the interleaving methods described in U.S. Pat. No. 6,609,223 due to lack of computational resources.

Another advantage of shifted interleaving, according to embodiments of the present invention, is that error-correcting wildcard packets are interspersed more uniformly in the sequence of transmitted packets that in the interleaving methods described in U.S. Pat. No. 6,609,223. That is, blocks of consecutive wildcard packets are smaller, which makes it easier to manage the use of bandwidth.

In some embodiments of the present invention, the source packets to be encoded and transmitted come from an external source (such as described in U.S. Pat. No. 6,609,223). As discussed above, the number of transmitted packets is larger than the number of source packets, because extra wildcard packets are generated and added to the packets to be transmitted. Because data of the source packets must be reproduced and used at the subscriber computer with approximately the same timing, it is not possible to "slow down" the packet stream to accommodate the extra packets to be transmitted. Therefore the transmitted packets must be sent at a faster rate than the rate at which the source packets are received by the transmitter/encoder. If the source packets are received at a constant rate, then it is easy to see that the transmitted packets must be sent at an increased rate in proportion to the proportion of wildcard packets being added. Further, it is desirable for the transmitted packets to be sent at a rate as uniform as possible, so that a burst error in the transmission network cannot cause a loss of a disproportionate number of packets.

However, if the source packets come from an external source, it may be (and often is) the case that they are not received at a uniform rate. This makes it difficult to predict the desired rate at which to send the transmitted packets when sending large sets of consecutive wildcard packets, as is the case with the methods described in U.S. Pat. No. 6,609,223. As described below, the present invention overcomes this drawback of the methods described in U.S. Pat. No. 6,609,223.

According to an embodiment of the present invention, a transmitter is configured to utilize the following parameters:

L or (m_nNumSharesInLot) refers to the number of shares per lot;

K or (m_nNumSrcPktsInShare) refers to the number of source packets per share, typically 128;

E or (m_nNumECPktsPerShare) refers to the number of error-correcting or wildcard packets per share, typically between 1 and 128; and S or (m_nInterleaveShift) refers to an amount that the starting and ending points of a given share are "shifted" with respect to the starting and ending points of a previously numbered share.

According to this embodiment, S or (m_nInterleaveShift), that is, the time shift between consecutive shares, is computed from the other parameters as follows:

(m_nInterleaveShift)=[(m_nNumSrcPktsInShare)+(m_nNumECPktsPerShare)]/(m_nNumSharesInLot);

if (m_nInterleaveShift=>0), then (m_nInterleaveShift)=1, that is:

$$S=(K+E)/L; \quad \text{(equation A)}$$

if S approaches 0, then S=1.

The transmitter uses two variables to represent the current state (that is, to represent the packet to be transmitted next):

R or (m_nCurrentShare), with $0 \leq R \leq (L-1)$, i.e., R ranges from 0 to (m_nNumSharesInLot)−1;

C or (m_nCurrentCol).

In the diagram of FIG. 2, the number of source packets per share, K, is 4; the number of error-correcting or wildcard shares, E, is 2; the number of shares per lot, L, is 3; and the time shift between consecutive transmitted shares, S, is 2. R and C identify the row and column, respectively, in FIG. 2. (The top row in FIG. 2, denoted by the numbers 0, 1, ..., 17, shows the column numbers.)

As each packet is sent, R or (m_nCurrentShare) is increased by one. If R or (m_nCurrentShare) is to be increased to L or (nNumSharesInLot), then R is reset to 0 and C or (m_nCurrentCol) is increased by one.

Given the current share and column number, the position, P or (nShiftedPos), of the packet within the share is given by:

$$P=C-R*S\%(K+E), \quad \text{(equation B)}$$

where % means modulo. That is:

(nShiftedPos)=[(m_nCurrentCol)−(m_nCurrentShare)*(m_nInterleaveShift)] % [(m_nNumSrcPktsInShare)+(m_nNumECPktsPerShare)].

The position, P, takes values from 0 to (K+E−1), that is, $0 \leq P \leq (K+E-1)$.

At the beginning, positions where C<R*S or (m_nCurrentCol)<(m_nCurrentShare)*(m_nInterleaveShift) are skipped. That is, the state variables are incremented without sending any packet. Thus, the first instance of each share starts S or (m_nInterleaveShift) columns after the previous share, as can be seen in the diagram of FIG. 2.

If P or (nShiftedPos) corresponds to the position of a source packet (that is, it is less than K or (m_nNumSrcPktsInShare)), the packet is a source packet and the contribution of the source packet to the error-correcting or wildcard packets is computed using the methods described in U.S. Pat. No. 6,609,223, and the source packet is transmitted.

If P or (nShiftedPos) corresponds to the position of an error-correcting or wildcard packet (that is, it is greater than or equal to K or (m_nNumSrcPktsInShare)), then the corresponding wildcard packet is transmitted. The wildcard packets are ready to be sent as soon as the last source packet is sent.

Each packet is assigned a lot number. The first instance of each share is assigned lot number 0, and each subsequent instance has a lot number incremented by one.

According to an embodiment of the present invention, lot numbers are 16-bit integers, that is, they "wrap around" at 65536. Each packet is labeled with a share number, R of (m_nCurrentShare); a lot number, T or (LotNumber); and a position, P or (nShiftedPos). The column number, C or (m_nCurrentCol), can be recovered from this information by the following relation:

$$C=T*(K+E)+P+R*S\%65536*(K+E),$$

that is:

column=(LotNumber)*[(m_nNumSrcPktsInShare)+(m_nNumECPktsPerShare)]+(nShiftedPos)+(m_nCurrentShare)*(m_nInterleaveShift)

modulo 65536*[(m_nNumSrcPktsInShare)+(m_nNumECPktsPerShare)].

At the subscriber computer, the receiver/decoder collects packets as they are received and stores them in memory. When sufficient packets are received to decode a given share, this share is decoded to reconstruct the original source packets, using the methods described in U.S. Pat. No. 6,609,223. If more packets are missing than can be recovered using the error-correcting methods described in U.S. Pat. No. 6,609,223, then the receiver/decoder takes a best-effort approach, and uses the source packets that have been received, as also discussed in U.S. Pat. No. 6,609,223.

Because the receiver/decoder can reconstruct the column and share numbers corresponding to the packets, using the relations discussed above, it can output the decoded source packets in the order that the source packets were received at the transmitter/encoder.

Figure 3:
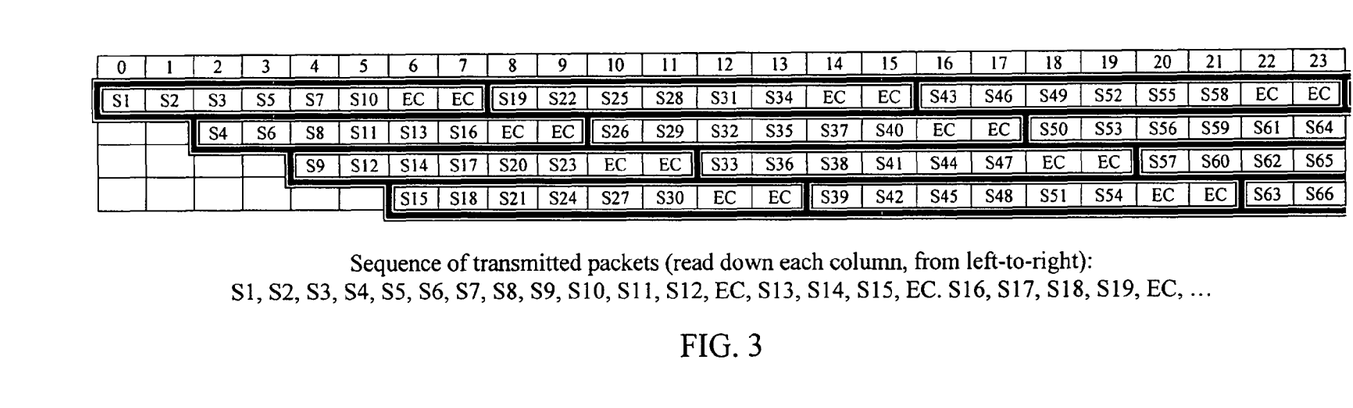
FIG. 3 depicts another example of shares of interleaved packets, according to an embodiment of the present invention, in which the shares are time-shifted with respect to each other.

FIG. 3 shows a diagram of an arrangement of shares of interleaved packets, in which the shares are time-shifted with respect to each other. In the diagram of FIG. 3, the number of source packets per share, K, is 6; the number of error-correcting or wildcard shares, E, is 2; and the number of shares per lot, L, is 4. (The top row in FIG. 3, denoted by the numbers 0, 1, ..., 23, shows the column numbers.)

In keeping with equation A (shown above), the time shift between consecutive transmitted shares, S, is 2. Also, in keeping with equation B (shown above), the positions of the packets are determined by P=C−R*S % (K+E), with $0 \leq P \leq (K+E-1)$.

For example, the packets of column 7 in FIG. 3 are determined as follows:

For the share R=0, P=7−0*2=7. Because P>K, this packet corresponds to a wildcard packet located at position 7 of the share R=0 (corresponding to the eighth packet of the share, with the first packet corresponding to position 0);

For the share R=1, P=7−1*2=5. Because P<K, this packet corresponds to a source packet located at position 5 of the share R=1 (corresponding to the sixth packet of the share, with the first packet corresponding to position 0);

For the share R=2, P=7−2*2=3. Because P<K, this packet corresponds to a source packet located at position 3 of the share R=2 (corresponding to the fourth packet of the share, with the first packet corresponding to position 0); and For the share R=3, P=7−3*2=1. Because P<K, this packet corresponds to a source packet located at position 1 of the share R=3 (corresponding to the second packet of the share, with the first packet corresponding to position 0).

Similarly, for example, the packets of column 13 in FIG. 3 are determined as follows:

For the share R=0, P=13−0*2=13. Because 13>K+E, 13 modulo 8 results in P=5. Because P<K, this packet corresponds to a source packet (corresponding to the sixth packet of the share, with the first packet corresponding to position 0);

For the share R=1, P=13−1*2=11. Because 11>K+E, 11 modulo 8 results in P=3. Because P<K, this packet corresponds to a source packet located at position 3 of the share R=1 (corresponding to the fourth packet of the share, with the first packet corresponding to position 0);

For the share R=2, P=13−2*2=9. Because 9>K+E, 9 modulo 8 results in P=1. Because P<K, this packet corresponds to a source packet located at position 1 of the share R=2 (corresponding to the second packet of the share, with the first packet corresponding to position 0); and For the share R=3, P=13−3*2=7. Because P>K, this packet corresponds to a wildcard packet located at position 7 of the share R=3 (corresponding to the eighth packet of the share, with the first packet corresponding to position 0).

According to an embodiment of the present invention, the parameters are chosen so that a given share will correspond to a given window of real time, e.g. 20 seconds. This is so that the error-correcting properties of the algorithm can correspond to recovery of signal losses for real periods of time. Accordingly, these parameters are set based on predictions about the rate at which source packets are received.

The rate at which source packets are actually received may differ from predictions, and there it is desirable in such cases to keep the shares approximately within the desired window of real time, by sending fewer packets in the share. To achieve such a result, according to an embodiment of the present invention, a time marker is maintained for each share. The time marker measures the amount of time since the first wildcard packet of the previous instance of that share. If this time exceeds a given timeout value, the share is marked as "running late" and any remaining source packets for that share are skipped. That is, when positions corresponding to any remaining source packets come up during an iteration of encoding and transmission processing, nothing is sent and the iteration continues. These skipped packets may be accounted for in the same manner as described in the "Timeout Case" of U.S. Pat. No. 6,609,223.

The number of error-correcting or wildcard packets for the "running late" share can also be reduced, as described in the "Timeout Case" of U.S. Pat. No. 6,609,223. In such a situation, the iteration simply skips over any positions corresponding to wildcard packets that are not to be sent.

According to an embodiment of the present invention, the above-described shifted interleaving scheme is performed by a computer programmed to perform the steps of the scheme.

It will be appreciated that the shifted interleaving scheme of the present invention can be applied to any error-correcting process for transforming a plurality of source packets into a plurality of encoded packets, such that the source packets can be recovered (i.e., decoded) from a sufficient subset of the encoded packets. Of course, it will be appreciated that the invention may take forms other than those specifically described, and the scope of the invention is to be determined solely by the following claims.

What is claimed is:

1. A method for transmitting interleaved shares of packet-level forward-error-correction encoded packets, each share including source packets and wildcard packets, wherein a given time shift occurs between consecutive shares, the method comprising the steps of:

determining a current state;

associating a packet with a share based on the current state;

determining a position of the packet within the share based on the given time shift; and, if the position of the packet corresponds to a source packet position, computing a contribution from the packet to wildcard packets of the share and transmitting the packet as a source packet, or, if the position of the packet corresponds to a wildcard packet position, transmitting the packet as a wildcard packet, wherein positions of two consecutive packets within two shares are not the same, and wherein the above steps are performed by a processor.

2. A method according to claim 1, wherein the given time shift is a difference in time between points of consecutive shares.

3. A method according to claim 1, wherein multiple shares of packets are transmitted as a lot, and wherein the method further comprises the steps of:

determining the given time shift, S, based on:

a number of source packets per share, K, a number of wildcard packets per share, E, and a number of shares per lot, L, wherein K, E and L are integers; and shifting a share by the given time shift, S, relative to a previous share, wherein S=(K+E)/L.

4. A method according to claim 3, wherein:

the multiple shares of packets form an interleaved arrangement, and the step of determining a position of the packet within the share includes determining P=C−R*5 modulo (K+E), wherein:

P represents the position of the packet within the share,

C represents a column number in the arrangement,

R represents a share number in the lot.

5. A method according to claim 4, wherein:

$0 \leq P \leq (K+E-1)$;

$0 \leq R \leq (L-1)$; and

C=is any one of 0, 1, 2, 3, . . . .

6. A method of shifting interleaved shares of packet-level forward-error-correction encoded packets to be transmitted, in which multiple shares of packets are transmitted as a lot, the method comprising the steps of:

determining a time shift, S, based on:

a number of source packets per share, K, a number of error-correcting packets per share, E, and a number of shares per lot, L, wherein K, E and L are integers; and shifting each interleaved share of packet-level forward-error correction encoded packets by the time shift, S, relative to a corresponding previous share, wherein S=(K+E)/L, wherein positions of two consecutive packets within two shares are not the same, and wherein the above steps are performed by a processor.

7. A method according to claim 6, wherein the step of shifting includes shifting a start point of the interleaved share by the time shift, S, relative to a start point of the corresponding previous share.

8. A method according to claim 6, further comprising the step of:

determining a position, P, of a packet in the interleaved share based on an interleaved arrangement of packets according to:

$P = C - R*S \bmod (K+E)$, wherein:
C represents a column number in the arrangement,
R represents a share number in the lot.

9. A method according to claim 8, wherein:
$0 \leq P \leq (K+E-1)$;
$0 \leq R \leq (L-1)$; and
C=is any one of 0, 1, 2, 3, . . . .

10. A method according to claim 8, wherein the time shift, S, represents a number of columns the interleaved share is shifted relative to the corresponding previous share.

11. A method according to claim 8, further comprising the step of:
if P<K, determining an error-correction contribution to the interleaved share from a source packet at the position, P.

12. A method for transmitting interleaved shares of packet-level forward-error-correction encoded packets to be transmitted, in which multiple shares of packets are transmitted as a lot, the method comprising the steps of:
determining a time shift, S, based on:
a number of source packets per share, K,
a number of error-correcting packets per share, E, and
a number of shares per lot, L,
wherein K, E and L are integers, and
wherein S=(K+E)/L;
shifting a share by the time shift, S, relative to a previous share;
arranging the lot packets to be transmitted according to columns and rows, with C representing a column number and R representing a row number, wherein $0 \leq R \leq (L-1)$ and R corresponds to a share in the lot;
transmitting a packet at a first position identified by R and C;
determining a next position such that:
if R+1=L, set R=0 and increase C by 1, or,
if R+1<L, then set R=R+1; and
transmitting a packet at the next position,
wherein positions of two consecutive packets within two shares are not the same.

13. A method according to claim 12, further comprising the step of:
determining a position, P, of a packet in a share of the lot based on an interleaved arrangement of packets according to P=C−R*S modulo (K+E).

14. A method according to claim 13, wherein:
C=is any one of 0, 1, 2, 3, . . . , and
$0 \leq P \leq (K+E-1)$.

15. A method according to claim 13, wherein the time shift, S, represents a number of columns a share of the lot is shifted relative to a previous share of the lot.

16. A method according to claim 13, further comprising the step of:
if P<K, determining an error-correction contribution to the share from a source packet at the position, P.

17. A computer programmed to perform transmitting of interleaved shares of packet-level forward-error-correction encoded packets, each share including source packets and wildcard packets, wherein a given time shift occurs between consecutive shares, by using a processor to perform the steps of:
determining a current state;
associating a packet with a share based on the current state;
determining a position of the packet within the share based on the given time shift; and,
if the position of the packet corresponds to a source packet position, computing a contribution from the packet to wildcard packets of the share and transmitting the packet as a source packet, or, if the position of the packet corresponds to a wildcard packet position, transmitting the packet as a wildcard packet,
wherein positions of two consecutive packets within two shares are not the same.

18. A computer programmed to perform shifting of interleaved shares of packet-level forward-error-correction encoded packets to be transmitted, in which multiple shares of packets are transmitted as a lot, by using a processor to perform the steps of:
determining a time shift, S, based on:
a number of source packets per share, K,
a number of error-correcting packets per share, E, and
a number of shares per lot, L,
wherein K, E and L are integers; and
shifting each interleaved share of packet-level forward-error correction encoded packets by the time shift, S, relative to a corresponding previous share, wherein S=(K+E)/L, wherein positions of two consecutive packets within two shares are not the same.

19. A computer programmed to perform transmitting of interleaved shares of packet-level forward-error-correction encoded packets to be transmitted, in which multiple shares of packets are transmitted as a lot, by using a processor to perform the steps of:
determining a time shift, S, based on:
a number of source packets per share, K,
a number of error-correcting packets per share, E, and
a number of shares per lot, L,
wherein K, E and L are integers, and
wherein S=(K+E)/L; shifting a share by the time shift, S, relative to a previous share;
arranging the lot packets to be transmitted according to columns and rows, with C representing a column number and R representing a row number, wherein $0 \leq R \leq (L-1)$ and R corresponds to a share in the lot;
transmitting a packet at a first position identified by R and C;
determining a next position such that:
if R+1=L, set R=0 and increase C by 1, or,
if R+1<L, then set R=R+1; and transmitting a packet at the next position, wherein positions of two consecutive packets within two shares are not the same.

20. A communications system for transmitting interleaved shares of packet-level forward-error-correction encoded packets, each share including source packets and wildcard packets, wherein a given time shift occurs between consecutive shares, comprising:
a transmitter configured to perform:
determining a current state;
associating a packet with a share based on the current state;
determining a position of the packet within the share based on the given time shift; and,
if the position of the packet corresponds to a source packet position,
computing a contribution from the packet to wildcard packets of the share and transmitting the packet as a source packet, or, if the position of the packet corresponds to a wildcard packet position, transmitting the packet as a wildcard packet,
wherein positions of two consecutive packets within two shares are not the same.

21. A communications system for transmitting shifted interleaved shares of packet-level forward-error-correction encoded packets, in which multiple shares of packets are transmitted as a lot, comprising:

a transmitter configured to perform:
determining a time shift, S, based on:
a number of source packets per share, K,
a number of error-correcting packets per share, E, and
a number of shares per lot, L,
wherein K, E and L are integers; and
shifting each interleaved share of packet-level forward-error correction encoded packets by the time shift, S, relative to a corresponding previous share, wherein S=(K+E)/L,
wherein positions of two consecutive packets within two shares are not the same.

22. A communications system for transmitting interleaved shares of packet-level forward-error-correction encoded packets to be transmitted, in which multiple shares of packets are transmitted as a lot, comprising:

a transmitter configured to perform:
determining a time shift, S, based on:
a number of source packets per share, K,
a number of error-correcting packets per share, E, and
a number of shares per lot, L,
wherein K, E and L are integers, and
wherein S=(K+E)/L;
shifting a share by the time shift, S, relative to a previous share;
arranging the lot packets to be transmitted according to columns and rows, with C representing a column number and R representing a row number, wherein $0 \leq R \leq (L-1)$ and R corresponds to a share in the lot;
transmitting a packet at a first position identified by R and C;
determining a next position such that:
if R+1=L, set R=0 and increase C by 1, or,
if R+1<L, then set R=R+1; and
transmitting a packet at the next position,
wherein positions of two consecutive packets within two shares are not the same.

* * * * *

UNITED STATES PATENT AND TRADEMARK OFFICE
CERTIFICATE OF CORRECTION

PATENT NO.         : 8,223,643 B1
APPLICATION NO.    : 11/516197
DATED              : July 17, 2012
INVENTOR(S)        : H. Lewis Wolfgang It is certified that error appears in the above-identified patent and that said Letters Patent is hereby corrected as shown below:

In the Specification

COLUMN 2
   Line 50, "would desirable" should read --would be desirable--.

COLUMN 3
   Line 18, "according" should read --accordingly--.

COLUMN 4
   Line 21, "¶ Because" should read --Because--;
   Line 24, "However," should read --¶ However,--; and
   Line 40, "that in" should read --than in--.

In the Claims

COLUMN 8
   Claim 4, Line 35, "P=C-R*5" should read --P=C-R*S--.

COLUMN 9
   Claim 8, Line 1, "*P=C-R*S modulo (K+E),*" should read --*P=C-R*S modulo (K+E)*,--
      (conformed font).

Signed and Sealed this
First Day of April, 2014

Michelle K. Lee
*Deputy Director of the United States Patent and Trademark Office*